United States Patent
Hanna et al.

(10) Patent No.: US 7,042,994 B2
(45) Date of Patent: May 9, 2006

(54) METHOD AND APPARATUS FOR MAKING A LONG DISTANCE TELEPHONE CALL

(75) Inventors: George B. Hanna, Marietta, GA (US); Hong Nguyen, Atlanta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 71 days.

(21) Appl. No.: 10/600,193

(22) Filed: Jun. 19, 2003

(65) Prior Publication Data

US 2004/0258227 A1 Dec. 23, 2004

(51) Int. Cl.
*H04M 15/00* (2006.01)

(52) U.S. Cl. .......................... 379/121.02; 379/114.26; 379/114.29; 379/115.02; 379/121.03

(58) Field of Classification Search ............. 379/114.1, 379/121.01, 115.01, 114.28, 114.29, 121.02, 379/114.06, 114.02, 114.15, 114.2, 121.03, 379/127.04, 126, 127.05, 127.03, 114.01, 379/114.14, 114.26, 115.02; 455/405

See application file for complete search history.

(56) References Cited

U.S. PATENT DOCUMENTS

| | | | | |
|---|---|---|---|---|
| 5,438,568 A | * | 8/1995 | Weisser, Jr. ................ 370/389 |
| 5,666,405 A | * | 9/1997 | Weber .................... 379/127.03 |
| 5,771,282 A | * | 6/1998 | Friedes .................. 379/121.03 |
| 5,781,620 A | * | 7/1998 | Montgomery et al. .. 379/114.02 |
| 6,282,274 B1 | * | 8/2001 | Jain et al. .............. 379/114.26 |
| 6,324,269 B1 | | 11/2001 | Malik .................... 379/114.23 |
| 6,424,707 B1 | | 7/2002 | Chatterjee .............. 379/212.01 |
| 6,453,031 B1 | | 9/2002 | Malik .................... 379/114.23 |
| 6,470,187 B1 | | 10/2002 | Rosen et al. ................ 455/465 |
| 6,490,273 B1 | | 12/2002 | DeNao et al. .............. 370/352 |
| 6,570,967 B1 | | 5/2003 | Katz ....................... 379/93.12 |
| 6,647,112 B1 | * | 11/2003 | Smith .................... 379/220.01 |
| 6,718,029 B1 | * | 4/2004 | Zey ........................ 379/221.02 |
| 2003/0152211 A1 | * | 8/2003 | Kruger et al. ......... 379/221.02 |
| 2003/0179857 A1 | * | 9/2003 | Conn et al. ................ 379/1.01 |

* cited by examiner

Primary Examiner—Binh K. Tieu
(74) Attorney, Agent, or Firm—Cantor Colburn LLP

(57) ABSTRACT

A method for making a long distance or international telephone call is disclosed. A subscriber calls an assigned telephone number to access a sign-up calling plan service billed to a home plan at the home plan rates, and responds to a service announcement by entering the subscriber's home telephone number and a personal identification number that validates the caller. Another service announcement is responded to by the subscriber entering a selection responsive to whether the long distance call is an international call or not. To complete the call, the subscriber enters the long distance telephone number.

15 Claims, 1 Drawing Sheet

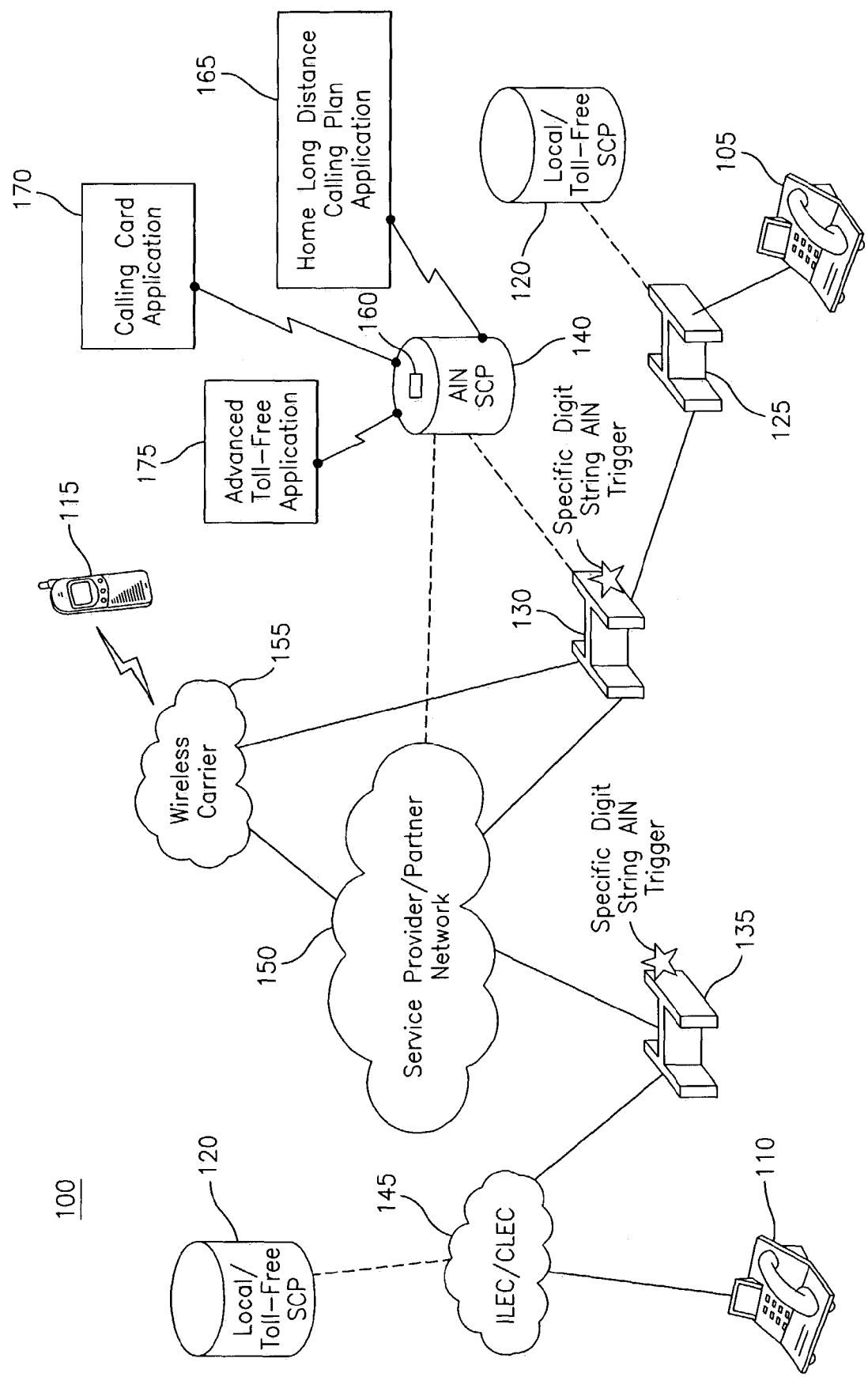

METHOD AND APPARATUS FOR MAKING A LONG DISTANCE TELEPHONE CALL

BACKGROUND OF THE INVENTION

The present disclosure relates generally to a method and apparatus for making a long distance telephone call, and particularly to a method and apparatus for making long distance or international telephone calls from a remote phone and having the call billed to a home plan phone bill at the home plan rates.

Long distance telephone calling plans are available from long distance carriers and include such arrangements as service provider home billing plans, service provider calling card plans, and third party calling card plans, for example. Service provider home billing plans provide for long distance calling from a home phone that is billed to a home plan, but do not provide for long distance calling from a phone other than a home phone at the home plan rates. Service provider calling card plans provide for long distance calling from a remote location that is billed to a home plan, but do not provide for long distance calling through a toll-free access line at the home plan rates. Third party calling card plans provide for long distance calling from any location on a pre-paid basis, but do not provide for billing to a home plan at the home plan rates. Accordingly, there is a need in the art for a long distance calling plan that provides for remote access at low rates.

SUMMARY OF THE INVENTION

In one embodiment, a method for making a long distance or international telephone call is disclosed. A subscriber calls an assigned telephone number to access a sign-up calling plan service billed to a home plan at the home plan rates, and responds to a service announcement by entering the subscriber's home telephone number and a personal identification number that validates the caller. To complete the call, the subscriber enters the long distance (international or otherwise) telephone number.

In another embodiment, a method for routing and billing a telephone call placed under a sign-up calling plan is disclosed. At the outset, a telephone call is received at an originating switch. A query to a service control point is sent, and in response thereto, a carrier identifier is received. The call is routed to a service switching point and a trigger is encountered that identifies a service control point servicing the sign-up calling plan. In response to the trigger, a query is sent to the service control point servicing the sign-up calling plan, and in response thereto, an instruction is received to prompt the caller to input their home telephone number and personal identification number. In response to the caller input, a customer database is accessed from the service control point and the caller's sign-up calling plan is retrieved. After prompting the caller to input the telephone number to be called, the caller's sign-up calling plan is checked for authorization to complete the call. In response to receiving a call authorization, the call is routed and a billing call record is generated for the caller's sign-up calling plan.

In a further embodiment, a telephone system service control point includes a processor programmed for accessing a customer database to retrieve a caller's sign-up calling plan in response to a caller placing a call to access the caller's sign-up calling plan service, checking the caller's sign-up calling plan for authorization to complete the call in view of information input by the caller during the call, the information including at least one of the caller's home telephone number and the caller's personal identification number, and authorizing the call and sending to a service switching point a message containing call information and billing information relating to the caller's sign-up calling plan.

BRIEF DESCRIPTION OF THE DRAWINGS

Referring to the exemplary drawing wherein like elements are numbered alike, an exemplary sign-up calling plan service architecture in accordance with an embodiment of the invention is depicted.

DETAILED DESCRIPTION OF THE INVENTION

An embodiment of the present invention provides a method for making long distance and international telephone calls from a remote phone or cell phone using a sign-up calling plan and having the call billed on the caller's (subscriber's) home plan phone bill at the home plan rates. As used herein, the term home plan refers to the telephone service covering the subscriber's home telephones. The sign-up calling plan may be a home long distance calling plan, a calling card plan, or a toll-free calling plan, and while reference is made herein to a sign-up calling plan generally, it will be appreciated that any of the aforementioned sign-up calling plans may be used. With regard to a sign-up calling plan service being billed to a subscriber's home plan, the subscriber may choose to pre-purchase buckets of sign-up calling plan minutes or sign up for a perpetual per-minute rate. With either arrangement, billable usage is added to and included on the home plan bill.

The illustration provided is an exemplary embodiment of a home long distance calling plan service architecture (service architecture) 100, which includes remote telephones 105, 110, 115, local toll-free service control points (LTF SCP) 120, an originating service switching point (SSP) 125, a service provider SSP 130, a partner SSP 135, an advanced intelligent network service control point (AIN SCP) 140, a local exchange carrier (LEC) network 145 (alternatively referred to as Incumbent LEC (ILEC) and Competitive LEC (CLEC) network), a service provider/partner network 150, and a wireless carrier network 155. AIN SCP 140 includes a processor 160, which is programmed to access a customer database containing calling plan application information 165, 170, 175, discussed further below. Remote telephones 105, 110, 115 may be landline or cellular telephones, and refer generally to any telephone that is other than the caller's home telephone. As used herein, the term cellular telephone is intended to refer to any wireless telephone. As depicted, remote telephones 105, 110 are landline telephones in signal communication with originating SSP 125 and LEC network 145, respectively, and 115 is a cellular telephone in signal communication with wireless carrier network 155. While SSPs 125, 130, 135 are referred to as originating SSP, service provider SSP, and partner SSP, respectively, it will be appreciated that these labels are exemplary only and that other embodiments may use other SSP arrangements.

In an exemplary embodiment, when a caller wishes to place a long distance or international call using a sign-up calling plan, the caller first calls a plan-assigned telephone number, such as a toll-free 1-800-xxx-xxxx number for example, from a remote phone 105, which provides the caller with access to the subscribed sign-up calling plan service. Accessing the sign-up calling plan service through a toll-free access line enables the caller to place a long-distance call without invoking long-distance calling charges. The call placed at remote phone 105 is received at originating SSP 125, which sends a query to LTF SCP 120 for carrier information. In response to this query, originating SSP 125 receives a carrier ID (identifier) that identifies a service provider associated with and servicing the caller's call, and routes the call to service provider SSP 130. At service provider SSP 130, an AIN Specific Digit String (SDS) trigger is encountered that identifies a SCP servicing the sign-up calling plan. In an embodiment, service provider SSP 130 encounters an AIN SDS trigger when the appropriate sequence of digits is dialed. For example, the trigger may be set on any of the following sequence of dialed digits: NPA (Numbering Plan Area code), NPAN, NPANX, NPANXX, NPANXXX, NPANXXXX, NPANXXXXX, NPANXXXXXX. In other words, service provider SSP 130 will detect the SDS trigger if the called party ID matches a specific code, which may be from 3 to 10 digits. Triggers detected on a more specific code take precedence over triggers detected on a less specific code. In an exemplary embodiment, the SDS trigger is set on the ten-digit (800) number that the calling party dials. When service provider SSP 130 receives a call with the called party identification that matches the specific (800) number assigned to the subscriber's Home Long Distance Calling Plan, an SDS trigger is fired and service provider SSP 130 sends a call-related query to AIN SCP 140. AIN SCP 140, where the sign-up calling plan applications (home long distance calling plan application 165, calling card application 170, and toll-free calling plan application 175) reside, returns an instruction to prompt the caller to input their home telephone number and their personal identification number (PIN). In an alternative embodiment, service provider SSP 130 also receives in return an instruction to prompt the caller to input a selection identifying which sign-up calling plan the call should be billed to. In response to these requests, the caller inputs the requested information, thereby validating the caller as being an authorized user of the sign-up calling plan and setting up appropriate billing information. In response to the caller input, service provider SSP 130 communicates the caller input to AIN SCP 140, which accesses a customer database and retrieves the caller's sign-up calling plan. AIN SCP 140 then instructs service provider SSP 130 to play an announcement such as, "to place a call in the US or Canada, please press 1, to place an international call, please press 2", and then to prompt the caller to input the telephone number to be called, which the caller responds to by inputting the requested information. Armed with caller information, plan information, and desired call information, AIN SCP 140 checks the caller's sign-up calling plan to determine whether the caller is authorized to make the call. If the call is authorized, AIN SCP 140 sends a message to service provider SSP 130 that contains call information and billing information relating to the caller's sign-up calling plan. Service provider SSP 130 then routes the call to the desired location and generates a billing call record for inclusion on the caller's sign-up calling plan bill. If the call is not authorized, AIN SCP 140 instructs service provider SSP 130 to play an announcement to inform the caller that the call cannot be completed and to provide the reason why not.

In an embodiment, processor 160 at AIN SCP 140 includes programmed instructions for accessing a customer database, depicted generally at 165, 170, 175, to retrieve a caller's sign-up calling plan in response to a caller placing a call from a telephone 105 other than the caller's home telephone to access the caller's sign-up calling plan service, checking the caller's sign-up calling plan for authorization to complete the call in view of information input by the caller during the call, authorizing the call, and sending to service provider SSP 130 a message containing call information and billing information relating to the caller's sign-up calling plan.

Remote telephone 105 is representative of a telephone in signal communication with service provider SSP 130 and AIN SCP 140 via a service provider SSP 125; remote telephone 110 is representative of a telephone in signal communication with service provider SSP 130 and AIN SCP 140 via a local exchange carrier network 145, a partner SSP 135, and a service provider/partner network 150; and, cellular telephone 115 is representative of a telephone in signal communication with service provider SSP 130 and AIN SCP 140 via a wireless carrier network 155, and a service provider/partner network 150. In alternative embodiments, the caller may place a call to the subscribed sign-up calling plan service using either remote telephone 105, as discussed above, remote telephone 110, or cellular telephone 115. With regard to remote telephone 110 and cellular telephone 105 being points of origin of a subscriber call, signal communication to service provider SSP 130 follows known telephone system practices and procedures. However, when a subscriber places a call to a sign-up calling plan service for the purpose of making a long distance or international call and having the call billed to the sign-up calling plan, communication between service provider SSP 130 and the point of origin is controlled by AIN SCP 140 and the programming at processor 160 as herein described and disclosed.

Some embodiments of the invention may include some of the following advantages: remote access to buckets of minutes or low cost calling plan rates purchased from a long distance service provider and billed to a home plan; avoiding the need to have someone at home place a three-way long distance or international call with the remote subscriber being one of the parties; and, increased landline traffic and revenue generation for owners of landlines.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for making a long distance or international telephone call, comprising:

calling an assigned telephone number to access a sign-up calling plan service billed to a home plan at a home plan rate, the calling the assigned telephone number accessing a service switching point, the service switching point encountering a specific digit string trigger in response to the calling, the service switching point sending a call-related query to a service control point in response to the specific digit string trigger;

the service control point prompting generation of a calling plan service announcement;

responding to the calling plan service announcement by entering a selection responsive to whether the long distance call is to be billed to a home long distance calling plan, a calling card plan, or a toll-free calling plan;

responding to the calling plan service announcement by entering the a telephone number associated with the sign-up calling plan service and a personal identification number to validate the caller; and entering the long distance telephone number to complete the call.

2. The method of claim 1, wherein the calling an assigned telephone number further comprises:

calling an assigned telephone number from a telephone other than the subscriber's home telephone.

3. The method of claim 1, further comprising:

receiving a calling plan service announcement containing a notice that the call cannot be completed and the reason why not.

4. The method of claim 1, wherein the specific digit string trigger is encountered in response to a called party identifier, the called party identifier corresponding to at least part of a number dialed by a calling party.

5. A method for routing and billing a telephone call placed under a sign-up calling plan, comprising:

receiving a telephone call at a service switching point, the service switching point encountering a specific digit string trigger in response to the telephone call, the service switching point sending a call-related query to a service control point in response to the specific digit string trigger;

the service control point prompting generation of a calling plan service announcement;

the calling plan service announcement prompting a caller to select whether the call is to be billed to the caller's home long distance calling plan, the caller's calling card plan, or the caller's toll-free calling plan;

sending a query to the service control point and receiving in return a carrier identifier, the carrier identifier identifying a service provider associated with the received call;

routing the call to a service switching point associated with the service provider and encountering a trigger that identifies a service control point servicing the sign-up calling plan;

in response to the trigger, sending a query to the service control point servicing the sign-up calling plan and receiving in return an instruction to prompt the caller to input their home telephone number and personal identification number;

in response to the caller input, accessing a customer database from the service control point and retrieving the caller's sign-up calling plan;

prompting the caller to input the telephone number to be called;

checking the caller's sign-up calling plan for authorization to complete the call; and in response to receiving call authorization, routing the call and generating a billing call record for the caller's sign-up calling plan.

6. The method of claim 5, wherein the sign-up calling plan is a home long distance calling plan, a calling card plan, or a toll-free calling plan.

7. The method of claim 5, wherein the receiving a telephone call comprises:

receiving a telephone call from a telephone other than the caller's home telephone.

8. The method of claim 5, wherein:

the prompting the caller comprises prompting the caller via an instruction from the service control point to the service switching point; and the routing the call and generating a billing call record is responsive to the service control point sending a routing message containing billing information to the service switching point.

9. The method of claim 5, further comprising:

in response to receiving no call authorization, notifying the caller that the call cannot be completed and the reason why not.

10. The method of claim 5, wherein the specific digit string trigger is encountered in response to a called party identifier, the called party identifier corresponding to at least part of a number dialed by a calling party.

11. A telephone system service control point having a processor programmed for:

receiving a call-related query from a service switching point, the service switching point generating the call-related query in response to a specific digit string trigger;

accessing a customer database to retrieve a caller's sign-up calling plan in response to a caller placing a call to access the caller's sign-up calling plan service;

checking the caller's sign-up calling plan for authorization to complete the call in view of information input by the caller during the call, the information including at least one of the caller's home telephone number and the caller's personal identification number; and authorizing the call and sending to a service switching point a message containing call information and billing information relating to the caller's sign-up calling plan;

wherein the information input by the caller during the call further comprises a selection of whether the call is to be billed to a home long distance calling plan, a calling card plan, or a toll-free calling plan.

12. The service control point of claim 11, wherein the processor is further programmed for:

accessing a customer database to retrieve a caller's sign-up calling plan in response to a caller placing a call from a telephone other than the caller's home telephone.

13. The service control point of claim 11, wherein the caller's sign-up calling plan is a home long distance calling plan, a calling card calling plan, or a toll-free calling plan.

14. The service control point of claim 11, wherein the information input by the caller during the call further comprises a selection of whether the call is an international call or not.

15. The service control point of claim 11, wherein the specific digit string trigger is encountered in response to a called party identifier, the called party identifier corresponding to at least part of a number dialed by a calling party.

* * * * *